(12) United States Patent
Lawniczak et al.

(10) Patent No.: US 11,433,989 B2
(45) Date of Patent: Sep. 6, 2022

(54) FORCE APPLICATION DEVICE FOR A CONTROL STICK

(71) Applicant: SAFRAN ELECTRONICS & DEFENSE, Paris (FR)

(72) Inventors: Rémi-Louis Lawniczak, Boulogne Billancourt (FR); Yannick Attrazic, Boulogne Billancourt (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/609,100

(22) PCT Filed: May 6, 2020

(86) PCT No.: PCT/EP2020/062586
§ 371 (c)(1),
(2) Date: Nov. 5, 2021

(87) PCT Pub. No.: WO2020/225305
PCT Pub. Date: Nov. 12, 2020

(65) Prior Publication Data
US 2022/0212780 A1    Jul. 7, 2022

(30) Foreign Application Priority Data

May 6, 2019    (FR) ...................................... 1904712

(51) Int. Cl.
*G08B 5/22*          (2006.01)
*B64C 13/04*         (2006.01)
(Continued)

(52) U.S. Cl.
CPC ......... *B64C 13/0421* (2018.01); *G05G 9/047* (2013.01); *G06F 3/016* (2013.01);
(Continued)

(58) Field of Classification Search
CPC ................ B64C 13/0421; G05G 9/047; G05G 2009/04748; G05G 2009/04766; G06F 3/016
See application file for complete search history.

(56) References Cited

U.S. PATENT DOCUMENTS

| 6,320,284 B1 * | 11/2001 | Fontana ................. G05G 9/047 |
| | | 345/161 |
| 6,704,001 B1 * | 3/2004 | Schena .................... G06F 3/016 |
| | | 345/161 |

(Continued)

FOREIGN PATENT DOCUMENTS

| FR | 3 011 815 A1 | 4/2015 |
| WO | 00/26891 A1 | 5/2000 |

OTHER PUBLICATIONS

French Search Report dated Jan. 17, 2020 in French Application No. 1904712.

(Continued)

*Primary Examiner* — Toan N Pham
(74) *Attorney, Agent, or Firm* — Sughrue Mion, PLLC

(57) ABSTRACT

The present invention relates to a force application device for a control stick of an aircraft, wherein the control stick comprises a control lever (1) rotating a shaft (A1) about a first axis (A), the device comprising a magnetic brake (5a) which comprises a magnetisable element (50a) mounted on the shaft and a magnetic transmitter (51a) which is opposite the magnetisable element and free to rotate about the first axis relative to the magnetisable element, the magnetic transmitter having an activated state in which the magnetic transmitter is supplied with current and generates a magnetic field in a volume occupied by the magnetisable element, and a deactivated state in which the magnetic transmitter is not supplied with current and does not generate a magnetic field, (Continued)

so as to prevent the magnetisable element from rotating about the shaft relative to the magnetic transmitter.

16 Claims, 6 Drawing Sheets

(51) Int. Cl.
*G05G 9/047* (2006.01)
*G06F 3/01* (2006.01)

(52) U.S. Cl.
CPC ............. *G05G 2009/04748* (2013.01); *G05G 2009/04766* (2013.01)

(56) References Cited

U.S. PATENT DOCUMENTS

| | | | | |
|---|---|---|---|---|
| 2004/0027332 | A1* | 2/2004 | Cope | H02K 41/031 345/161 |
| 2007/0235594 | A1 | 10/2007 | Wingett et al. | |
| 2011/0155861 | A1 | 6/2011 | Antraygue | |

OTHER PUBLICATIONS

International Search Report dated Jul. 13, 2020 in International Application No. PCT/EP2020/062586.
Written Opinion of the International Searching Authority dated Jul. 13, 2020 in International Application No. PCT/EP2020/062586.

* cited by examiner

FORCE APPLICATION DEVICE FOR A CONTROL STICK

CROSS REFERENCE TO RELATED APPLICATIONS

This application is a National Stage of International Application No. PCT/EP2020/062586 filed May 6, 2020, claiming priority based on French Patent Application No. 1904712 file May 6, 2019, the entire contents of each of which being herein incorporated by reference in their entireties.

FIELD OF THE INVENTION

The present invention relates to piloting devices used by the pilot in an aircraft cockpit. It relates in particular to an active pilot stick comprising an integrated force feedback to assist the pilot.

STATE OF THE ART

A piloting device in an aircraft cockpit comprises, in the usual manner, a pilot stick with in particular a control lever mounted in rotation about an axis called roll axis and an axis called pitch axis, these two axes being orthogonal to each other. Devices of the "joystick" type are most often encountered.

Based on the position of the lever along these two axes, the piloting device transmits movement commands to piloting members of the aircraft.

On the most recent aircraft models, the command of the motions of the aircraft is electronic and the piloting device integrated into the cockpit can be of the "side-stick" type. The position of the lever along the two roll and pitch axes is measured by sensors and translated into movement commands. The lever is not directly mechanically linked to the moving portions of the aircraft. There is no direct mechanical feedback on the lever, for the pilot.

However, it is desirable for the flight safety that the pilot perceives a mechanical feedback at the lever. The cockpit signaling systems may not be sufficient to cause the pilot to react quickly enough to unexpected events during flight. The piloting feelings are much better if the pilot side-stick integrates a force feedback, also called "haptic feedback".

As such, it has been proposed to equip the side-stick with passive mechanical force feedback systems, such as spring systems, or active electromechanical systems.

Document FR 3 011 815 describes an active force feedback device with an electric motor. In this document, the aircraft flight control device includes a control lever mounted on a plate and linked to a roll axis motor and a pitch axis motor via transmission shafts. The two motors are controlled according to a force law, so that during the operation of the side-stick, they generate a resistive force opposing the force exerted on the lever (force feedback), for example, when a force threshold is exceeded by the pilot.

Such a device proves efficient to restore the piloting feelings and increase flight safety. However, in the event of an electrical or mechanical fault at one of the motors or in the event of a failure on the motor control signal processing chain, the force feedback can be deleted.

In the field of aeronautics, the requirements in terms of availability of the piloting devices are high. It is therefore not acceptable that the pilot suddenly switches to a pilot mode without force feedback, in the event of a fault of a motor or of its processing chain.

In addition, the active force feedback systems of the state of the art often comprise a significant number of components, in particular roll and pitch motors, but also clutches, torque limiters, gears, etc. These systems can be expensive, bulky and difficult to integrate into an aircraft cockpit. In addition, the introduction of gears implies a reduction in the dynamic performances of the pilot stick, whose inertia increases, and causes a loss of ergonomics because the pilot feels the torque variations due to the presence of the gears.

The state of the art does not provide a suitable solution for maintaining the force feedback at the lever in the event of fault of a force feedback motor, having limited space requirement and good durability.

DISCLOSURE OF THE INVENTION

In view of the above, there is thus a need for a pilot stick integrating a mechanical backup channel, to prevent the rotation of the lever from being free and the pilot from losing all force feedback in the event of an electrical fault affecting a force feedback motor of the stick. A total loss of power supply of said force feedback motor is an example of such an electrical fault.

There is also a need for a pilot stick with lower mass, space requirement and power consumption compared to the existing pilot sticks.

There is also a need for a pilot stick integrating an operating mode in which the lever is not completely immobilized in the event of a failure affecting a force feedback motor, with a variable resistive force exerted on the lever based on the action of the pilot on the lever.

There is an additional need for a pilot stick in which the elements providing the force feedback have increased reliability and a satisfactory service life.

As such, a first object of the invention is a force application device for a pilot stick of an aircraft, in which the pilot stick comprises a control lever driving a shaft in rotation about a first axis, the device comprising a magnetic brake which comprises:
  a magnetizable element connected to the shaft,
  a magnetic transmitter opposite to the magnetizable element while being freely rotatable about the first axis relative to the magnetizable element, said magnetic transmitter having an activated state, in which the magnetic transmitter is supplied with current and generates a magnetic field at a volume occupied by the magnetizable element, and a deactivated state in which the magnetic transmitter is not supplied with current and does not generate a magnetic field, so as to prevent rotation of the magnetizable element relative to the magnetic transmitter about the shaft.

The magnetic brake of the force application device of the invention produces a force feedback on the shaft. Once the magnetizable element is magnetized, under the action of a magnetic field applied thereto, the rotation of the magnetizable element about the shaft relative to the magnetic transmitter is braked or blocked, by magnetostatic interaction. In case of relative movement of the shaft relative to the magnetic transmitter, a resistive force is indeed exerted on the magnetizable element.

The magnetic brake of the invention has low mechanical complexity. In addition, the braking of the shaft can be made without contact between the magnetic transmitter and the magnetizable element. There is no friction between the moving portions of the brake. The force application device of the invention therefore has an increased service life compared to mechanical locking braking systems.

In addition, in the absence of friction between the moving parts of the brake, there is no idle resistive torque, in the state where the magnetizable element is not magnetized.

Another advantage of the invention is that the force exerted on the shaft is very little sensitive to the temperature of the environment of the brake, which improves the reliability of the brake.

According to one possible operating mode, the brake is used as complement to a force feedback motor configured to exert a resistive force on the shaft during a flight. In the event of an electrical fault affecting a force feedback motor or its processing chain, for example a loss of power supply of the motor or a computer malfunction, the magnetic transmitter of the force application device is monitored so as to magnetize the magnetizable element.

For example, a complete blocking of the lever is provided in the event of an electrical fault affecting the motor, the resistive force exerted on the shaft by magnetostatic interaction after the occurrence of the fault event being large enough to block the shaft.

According to another possible operating mode, the magnetic brake is configured to exert a feedback according to a force and/or damping law, as a complement to or as a replacement for any force feedback motors. The magnetic brake is then integrated into the force feedback provided in normal operation of the pilot stick.

In the latter operating mode, it is not necessary to equip the pilot stick with electric force feedback motors which would be dimensioned to exert on their own the maximum resistive forces provided on the range of use of the pilot stick. The force application device of the invention thus allows reducing the mass and space requirement of the stick.

The force application device of the invention may further have the following characteristics, taken alone or in any of the technically possible combinations:

the shaft extends along the first axis.

Thus, the shaft is driven in rotation by the control lever about its own extension axis.

the magnetizable element linked to the shaft is mounted on the shaft.

the magnetizable element comprises at least one of the following materials: iron, cobalt, stainless steel, silicon, boron.

the magnetic transmitter is placed facing the magnetizable element, along the first axis.

the magnetic transmitter is a solenoid.

the magnetic transmitter is able to produce, at the volume occupied by the magnetizable element, a magnetic field of induction higher than a threshold comprised between 0.1 Tesla and 10 Tesla, the threshold being preferably greater than 1 Tesla.

the magnetizable element is configured to be magnetized when the magnetic transmitter is in the activated state and to be demagnetized when the magnetic transmitter is in the deactivated state.

the force application device further comprises a permanent magnetic device, configured to produce a permanent magnetic field at the volume occupied by the magnetizable element which compensates for the magnetic field of the magnetic transmitter when the magnetic transmitter is in the activated state.

the force application device further comprises a mechanical joint secured in rotation to the lever about a second axis, and a force sensor configured to measure a torque exerted on the lever which causes rotation of the mechanical joint about the second axis.

the force application device further comprises a mechanical joint secured in rotation to the lever about a roll axis and about a pitch axis, the pilot stick comprising the shaft, connected to the mechanical joint and whose rotation about the first axis is linked to the rotation of the mechanical joint about the roll axis, and comprising an additional shaft, connected to the mechanical joint and whose rotation about an additional axis is linked to the rotation of the mechanical joint about the pitch axis, the force application device further comprises an additional magnetic brake comprising:

an additional magnetizable element linked to the additional shaft, an additional magnetic transmitter opposite to the additional magnetizable element while being freely rotatable about the additional axis relative to the additional magnetizable element, said additional magnetic transmitter having an activated state, in which the additional magnetic transmitter is supplied with current and generates a magnetic field at the volume occupied by the additional magnetizable element, and a deactivated state in which the additional magnetic transmitter is not supplied with current and does not generate a magnetic field, so as to prevent a rotation of the additional magnetizable element relative to the additional magnetic transmitter about the additional shaft.

in the latter case, the additional magnetizable element is mounted on the additional shaft, and/or the additional shaft extends along the additional axis.

According to a second object, the invention relates to an active pilot stick for an aircraft, which comprises a force application device as defined above and which further comprises a lever movable in rotation about a second axis, the rotation of the shaft of the force application device about the first axis being linked to the rotation of the lever about the second axis.

This pilot stick may further have, in an optional and non-limiting manner, the following characteristics, taken alone or in any of the technically possible combinations:

the pilot stick further comprises:

a force feedback computer, a force feedback motor, the shaft corresponding to a drive shaft of said motor, said motor being configured to exert a force feedback on the second axis.

during the operation of the stick, a torque exerted by the force feedback motor is a function of a control signal transmitted by the computer.

The pilot stick further comprises an angular position sensor, the control signal being calculated based on an angular position of the shaft about the first axis measured by said sensor.

the force application device further comprises a backup power supply unit configured to provide power supply to the magnetic transmitter when the magnetic transmitter is in the activated state, said power supply being distinct from a power supply of the computer.

the magnetic transmitter of the force application device is configured to receive a power supply common with a power supply of the computer when the magnetic transmitter is in the activated state.

the force application device further comprises a permanent magnetic device, configured to produce a permanent magnetic field at the volume occupied by the magnetizable element of the force application device which compensates for the magnetic field of the magnetic transmitter when the magnetic transmitter is in the activated state.

An additional object of the invention is a method for mechanical backup monitoring of a force application device for an aircraft pilot stick, the method being implemented using a pilot stick as defined above, said stick comprising a force feedback motor, the method comprising the steps of:

detecting a fault on a processing chain of the force feedback motor, transmitting to the magnetic transmitter of the force application device an activation or deactivation signal for the magnetic transmitter, optionally, activating a force-pilot mode of the stick.

Another object of the invention is a method for monitoring in damping law a force application device for an aircraft pilot stick, the method being implemented using a pilot stick as defined above and comprising the steps of:

detecting a position and/or speed of the lever, generating an activation signal for the magnetic transmitter of the force application device comprising a magnetic field setpoint determined based on the position and/or of the speed of the lever according to a predetermined law, the activation signal being transmitted to the magnetic transmitter.

DESCRIPTION OF THE FIGURES

Other characteristics, aims and advantages of the invention will emerge from the following description, which is purely illustrative and not limiting, and which should be read in relation to the appended figures, among which.

DETAILED DESCRIPTION OF EMBODIMENTS OF THE INVENTION

In the following, examples relating to an aircraft pilot stick movable in rotation along a roll axis and along a pitch axis, will be described. The force application device of the invention is however used with the same advantages, in association with a pilot stick movable along one or several axes of movement different from a roll or pitch axis of rotation.

It is meant in the following by "damping law" of the magnetic brake the relationship between the rotary position of the lever along an axis of rotation and the resistive force produced by means of the brake against a movement in rotation about said axis. It is also meant by "force law" the relationship between the position of the lever and the total force returned to the lever, which can be resistive or motive (this total force taking into account the action of the mechanical brake(s) and possibly the action of one or more force feedback motors or other elements).

In all of the figures and in the description below, the similar elements bear identical alphanumeric references.

Figure 1:
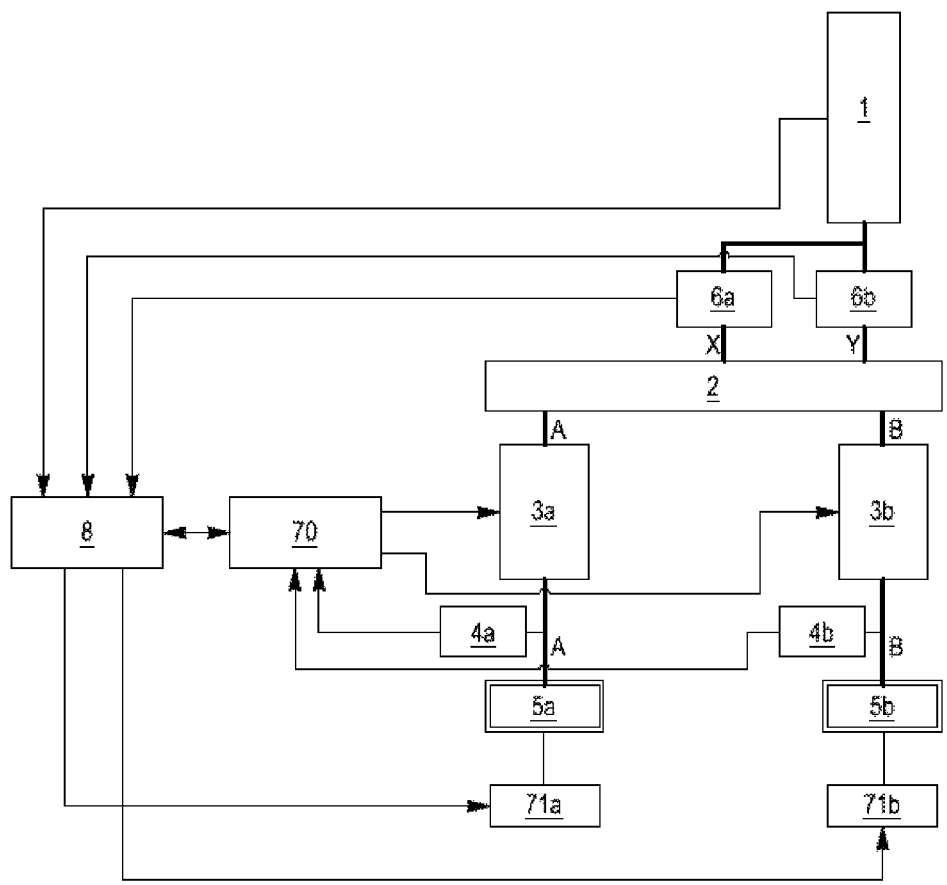
FIG. 1 functionally represents the overall architecture of a piloting system comprising a pilot stick according to one embodiment of the invention.

FIG. 1 represents a functional architecture of an aircraft piloting system, the aircraft being in particular piloted along roll and pitch axes. The represented piloting system comprises in particular a pilot side-stick, examples of which will be described in detail below. The side-stick is typically found in the cockpit of the aircraft.

In this figure, the thicker lines between two functional units correspond to mechanical links. The arrow links are electronic links through which data can be transmitted.

The system comprises a control lever 1, mounted on a mechanical joint 2, for example on a plate of the mechanical joint. The lever is rotatably mounted about a roll axis X and a pitch axis Y of the lever, the two axes being orthogonal. The mechanical joint 2 can be mounted on a casing of the aircraft, the casing being secured to the floor of the aircraft. The pilot acts on the lever to control moving portions of the aircraft.

Usually, electronic lever position signals acquired by an angular lever position sensor 4a associated with the roll axis X and an angular lever position sensor 4b associated with the pitch axis Y are communicated to a flight control unit 8, or FCS (Flight Control System). Optionally, the sensors 4a and 4b also communicate information on the speed of rotation of the lever 1 along these axes. The lever position/speed information is translated into piloting control signals for moving portions of the aircraft by the control unit 8.

The pilot stick of FIG. 1 further comprises a device for applying a force on the roll and pitch axes of the lever. One function of the force application device is to ensure the force feedback on the stick, in response to the handling of the lever 1 by the pilot, as a complement to force motors or by replacing force motors.

In the present example, the force application device comprises an electric motor 3a associated with an A-axis drive shaft linked to the roll axis X of the lever. It is meant by "linked to the axis" that a motion transmission exists between the shaft of axis A and an element of the joint 2. When the lever pivots along the axis X, the drive shaft of the motor 3a is therefore driven in rotation. Likewise, the device comprises an electric motor 3b associated with a drive shaft of axis B linked to the pitch axis Y of the lever. The motors 3a and 3b are force feedback motors.

Alternatively, the motor 3a could be arranged to act directly on the roll axis X via a rotating shaft linked to the joint 2 and the motor 3b could be arranged to act directly on the pitch axis Y via a rotating shaft linked to the joint 2.

To ensure the control of the force provided by the motors 3a and 3b, the pilot stick comprises a computer 70 configured to generate and transmit to the motors a control signal including a force setpoint, for example a torque setpoint exerted by the motors. The control unit 8 is configured to determine, based on the position/speed information of the lever and/or based on other data, the force setpoint. The force setpoint is for example calculated according to a predetermined force law. The computer 70 comprises an electronic interface for receiving signals including said position information and transmitting this information to the control unit 8.

Alternatively, the computer 70 can be configured to autonomously determine the force setpoint from the position/speed signals of the lever and/or from other data, and to generate the motor control signals from the force setpoint.

The force application device further comprises a first magnetic brake 5a linked to the axis A and a second magnetic brake 5b linked to the axis B. In the present example, these brakes are directly positioned respectively on the shaft of the motor 3a of axis A and on the shaft of the motor 3b of axis B.

Each magnetic brake comprises a magnetizable element and a magnetic transmitter opposite to the magnetizable element, of which a detailed example of a structure is described below. The magnetic transmitter has an activated state, in which it emits a magnetic field at the volume occupied by the magnetizable element, and a deactivated state, in which it does not emit said magnetic field. As will be seen below, the magnetostatic interactions between the magnetic transmitter and the magnetizable element are likely to brake or block the rotation of the shaft associated with the magnetic brake. It is meant by "magnetizable element" an element made in whole or in part of a material capable of being magnetized in response to a magnetic field applied thereto. Preferably, the magnetization acquired by the material of the magnetizable element disappears if the total magnetic field is canceled out at the volume occupied by said element.

According to a first variant which corresponds to the example of FIG. 1, the magnetic transmitters of the magnetic brakes 5a and 5b are controlled to selectively switch to the activated state or to the deactivated state.

Here, the magnetic transmitters of the brakes 5a and 5b each have respective backup power supply units 71a and 71b, distinct from a power supply of the computer 70. The selective control of the activated or deactivated state of the magnetic transmitters is performed by the backup power supply units.

One advantage is that in the event of a fault affecting the computer 70, for example an interruption in the power supply of the computer preventing reliable operation of the force feedback motors, the magnetic brakes remain under control.

In this example, the control of the backup power supply units, to control the supply of electric current to the magnetic transmitters of the brakes 5a and 5b, is ensured by the control unit 8 of the piloting system.

According to a second variant not illustrated in the appended drawings, the magnetic transmitter of a magnetic brake is configured to receive a common power supply with a power supply of the computer 70 when the magnetic transmitter is in the activated state. For example, the magnetic transmitter is powered directly through the computer 70.

In the latter variant, the activated or deactivated state of the magnetic transmitters may not be selectively controllable. The activated state then results from a normal power supply of the computer 70, and the deactivated state results from an interruption or a fault in the power supply of the computer 70. Alternatively, the computer 70 selectively controls the switching of the magnetic transmitter to the activated or deactivated state.

It will be noted that the motors 3a and 3b could be omitted from the piloting system, if the brakes 5a and 5b configured to act on the roll and pitch axes are maintained. The brakes 5a and 5b can then be controlled to exert a resistive force determined based on the position and/or speed of the lever 1, according to a damping law.

Optionally, the piloting system also comprises force sensors 6a and 6b measuring respectively the torque exerted on the lever pivotally along the axis X and along the axis Y. These can be all types of known force sensors, for example capacitive, piezoelectric or resistive sensors.

Such sensors are in particular useful if the piloting system comprises a force-pilot mode. In this mode, the lever 1 is immobilized and the control unit 8 determines control signals for the moving portions of the aircraft based on the forces applied on the lever 1 by the pilot.

Figure 2:
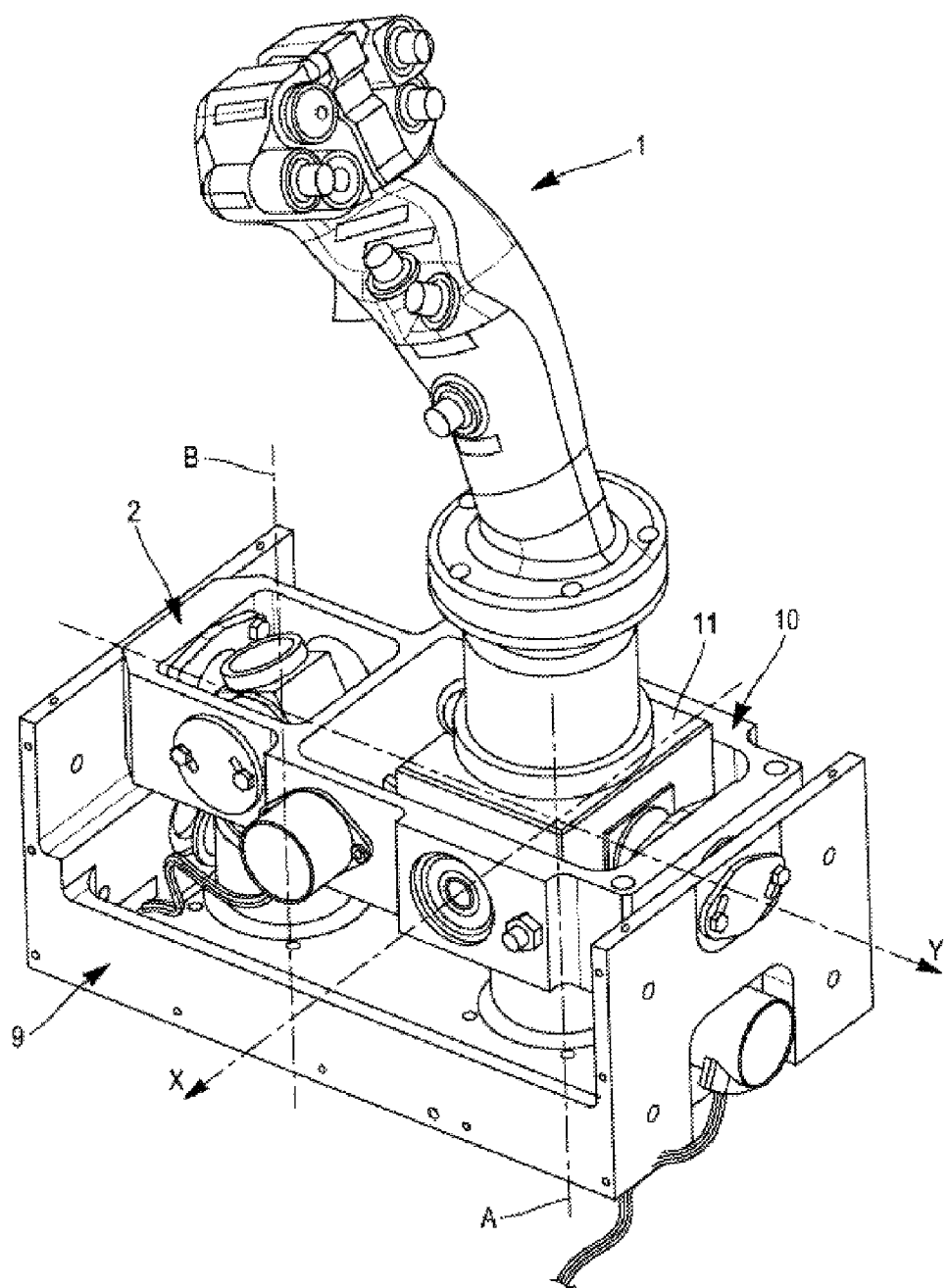
FIG. 2 is a perspective view of the lever and of the mechanical joint of the piloting system of FIG. 1.

FIG. 2 represents a pilot stick according to an exemplary embodiment in accordance with the architecture of FIG. 2. The lever 1 is arranged on a mechanical joint 2 fixed to a casing 9 secured to a frame of the aircraft. The joint is movable in rotation relative to the casing along the axes X and Y. The motors 3a and 3b (not visible in the figure) are offset from the lever. The brakes 5a and 5b are also offset from the lever.

The lever 1 is free at one end and fixed to a first plate 11 of the joint 2 at the other end. The first plate 11 is movable in rotation along the axis X and along the axis Y and is linked to a second plate 10 of the joint 2. The axis X is linked to the first plate 11, so that a pivoting of the first plate 11 about the axis Y pivots the axis X about the axis Y.

Two transmissions, each comprising a universal joint, translate a rotational motion of the lever along the axis X, respectively along the axis Y, into a rotational motion of a shaft A (not visible in the figure) extending along the axis A, respectively of a shaft A2 (not visible in the figure) extending along the axis B. The motor 3a and the magnetic brake 5a are associated with the shaft A1 which is a drive shaft of the motor 3a. The motor 3b and the magnetic brake 5b are associated with the shaft A2 which is a drive shaft of the motor 3b.

The motors 3a and 3b are thus in direct engagement on the mechanical joint 2 and can transmit a resistive or motive force in response to the pivoting motions of the lever 1 by the pilot, according to a force law or a predetermined damping law.

For more details on the structure of the joint 2 and on the mechanical link between this joint and the motors 3a and 3b, reference may be made to FIG. 1 of document FR 3 011 815 and to the description relating thereto.

Magnetic Brake of the Force Application Device

Figure 3:
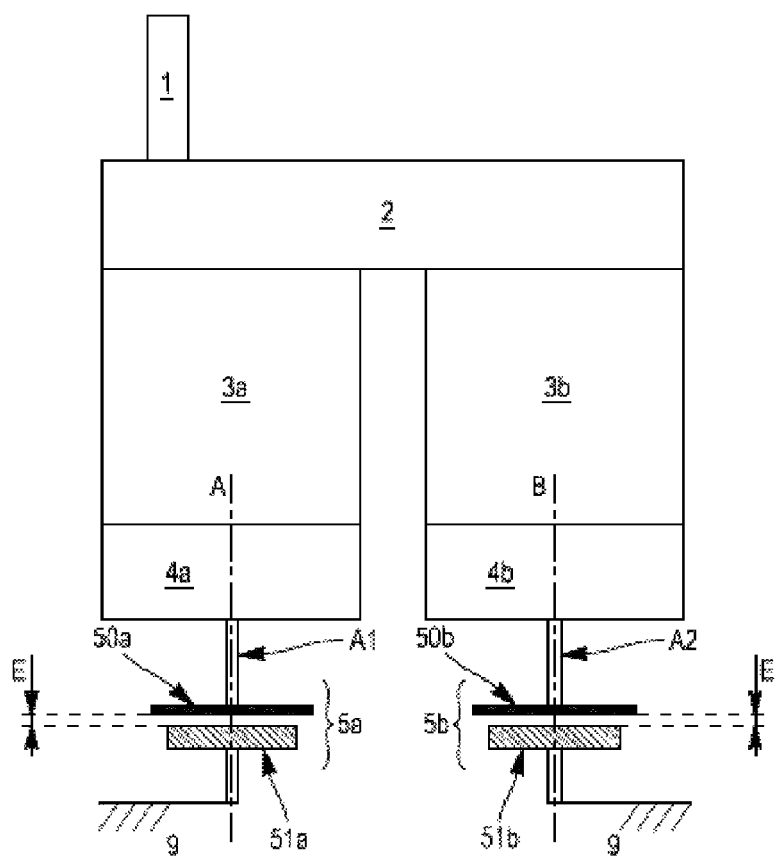
FIG. 3 is a schematic view of a pilot stick integrating a force application device according to one embodiment of the invention, the force application device comprising magnetic brakes.

FIG. 3 schematically illustrates an example of a pilot stick in accordance with the overall architecture of FIG. 1.

The pilot stick comprises a force application device intended to exert a force on the shafts A1 and A2 driven in rotation by the lever 1 of the stick, when the lever is respectively pivoted about its roll axis X and about its pitch axis Y. The force application device complements and/or backs up mechanically the roll motor 3a and the pitch motor 3b.

The brake 5a is located opposite to the mechanical joint 2 relative to the roll motor 3a and the brake 5b is located opposite to the mechanical joint 2 relative to the pitch motor 3b. One advantage of this arrangement of the brakes is to be able to offset the brakes relative to the mechanical joint 2 receiving the lever 1, so that space can be saved in the cockpit, the space in the vicinity of the lever being cleared.

As a variant, the brakes could be positioned directly in the vicinity of the joint 2, for example between the motors and the joint. It could be provided that the brake 5a acts directly on a shaft which extends among the roll axis X, instead of acting on the shaft A1 whose rotation about the axis A1 is linked to the rotation of the joint about the axis A. It could also be provided that the brake 5*b* acts directly on the pitch axis Y.

The following description relates to the structure of the magnetic brake 5*a* of the force application device, associated with the roll axis X of the lever and with the motor 3*a*; a magnetic brake 5*b* of similar structure and operation can be used for the pitch axis Y of the lever.

The force application device here comprises a magnetic brake 5*a* associated with the roll axis X. The rotation of the lever about the axis X is linked to the rotation of the shaft A1 about the axis A. In other words, the lever drives in rotation the shaft A1 when the lever is pivoted about the axis X.

Preferably, the lever 1 is mounted on a mechanical joint 2 secured to the lever in rotation about the axis X. For example, the mechanical joint conforms to that represented in FIG. 2 and a universal joint connection of the joint 2 transmits the motions of rotation between the axis X and the axis A.

Alternatively, the lever could directly drive the shaft A1 without passing through a mechanical joint.

It will be noted that here, the shaft A1 and the motor 3*a* which comprises said shaft as a drive shaft are integrated into the force application device.

The magnetic brake 5*a* comprises:
- a magnetizable element 50*a* linked to the shaft A1, so that a rotation of the shaft about the axis A causes a rotation of the magnetizable element about this same axis,
- a magnetic transmitter 51*a* opposite to the magnetizable element 50*a*, freely rotatable about the axis A relative to the magnetizable element 50*a*.

The magnetic transmitter 51*a* has an activated state, in which it is supplied with current and generates a magnetic field (for example a predetermined stable magnetic induction field) at the volume occupied by the magnetizable element, and a deactivated state in which it is not supplied with current and does not generate this field.

For example, if the magnetic transmitter is a solenoid, the activated state may correspond to the flow of an electric current at the terminals of the solenoid and the deactivated state may correspond to an absence of electric current at its terminals.

The magnetizable element 50*a* comprises a material capable of being magnetized in response to a magnetic field applied thereto, here in response to an activation or deactivation of the magnetic transmitter 51*a*. For example, the magnetizable element consists in whole or in part of a paramagnetic material; the particles of the magnetizable element then acquire a magnetic moment oriented in the same direction as that of the total magnetic field undergone by the volume occupied by the magnetizable element, the magnetizable element thus acquiring a magnetization which disappears if the total magnetic field is canceled. The magnetizable element can alternatively consist of a diamagnetic material.

The magnetizable element consists for example of all or part of iron, cobalt, stainless steel, silicon or boron, taken alone or in combination. The magnetizable element is for example a metal part fixed to one end of the shaft A1, typically a metal disk centered on the axis A of the shaft A1.

The shaft A1 extends along the axis A. The axis A thus constitutes an axis of extension of the shaft A1. The magnetizable element 50*a* is here mounted on the shaft A, along the axis A.

The magnetic transmitter 51*a* is here placed along the axis A, facing the magnetizable element 50*a*. The magnetic transmitter 51*a* is opposite to the magnetizable element 50*a*. As a result of this arrangement, the activation or deactivation of the magnetic transmitter causes a variation of the total magnetic field at the volume occupied by the magnetizable element.

The magnetic transmitter 51*a* and the magnetizable element 50*a* are here separated from each other by an air gap distance E, along the axis A of the shaft A1.

When the magnetizable element 50*a* is magnetized, due to the activation or deactivation of the magnetic transmitter 51*a*, a rotation of the magnetizable element 50*a* relative to the magnetic transmitter 51*a* is braked or blocked, by interaction between the magnetic field of the magnetizable element 50*a* and the magnetic field of the magnetic transmitter 51*a*.

The magnetic transmitter 51*a* is preferably linked to the casing 9; in the example of FIG. 3, the transmitter 51*a* is arranged between the magnetizable element 50*a* and the casing 9. Thus, after magnetization of the magnetizable element 50*a*, the motion of the shaft A1 relative to the casing 9 is braked or blocked. The pilot feels a force feedback when he tries to pivot the lever along the roll axis X relative to the fixed portions of the aircraft.

The magnetic brake defined above has many advantages. It is of low mechanical complexity. In addition, the braking of the shaft can be achieved without contact between the magnetic transmitter and the magnetizable element, unlike braking systems which would operate by mechanical locking, for example with a dog clutch. Parts achieving a mechanical locking of the movement of the lever would be subject to high friction and would therefore be likely to wear quickly. The wear of the magnetizable element 50*a* and of the magnetic transmitter 51*a* is here very reduced thanks to the absence of contact.

In addition, in the absence of friction between the moving parts of the brake, there is no idle resistive torque when the magnetizable element is not magnetized.

The magnetostatic interaction between the magnetizable element and the magnetic transmitter is also slightly variable based on the temperature of the magnetic brake medium.

Finally, the magnetostatic interaction between the magnetic transmitter and the magnetizable element can be monitored so that a relative movement between these parts is possible when the pilot exerts a high force on the lever, in which case the shaft A1 can be pivoted relative to the magnetic transmitter. Unlike a brake which would operate on the principle of a mechanical locking, the magnetic brake as defined above does not require the addition of a torque limiter to withstand a high force exerted by the pilot. The magnetic brake acts here as a natural torque limiter.

The force application device advantageously comprises a second magnetic brake 5*b* which comprises a magnetizable element 50*b* linked to the second shaft A2, as well as a magnetic transmitter 51*b* preferably linked to the casing 9. Thus, the resistive forces applied on the roll and pitch axes by the brakes can be independently monitored.

In a first embodiment, the magnetizable element 50*a* is not magnetized (or negligibly magnetized) in the deactivated state of the magnetic transmitter, that is to say in the absence of a magnetic field emitted by the magnetic transmitter. The magnetizable element 50*a* is then configured to be magnetized when the magnetic transmitter 51*a* is in the activated state, and to be demagnetized when the magnetic transmitter 51*a* is in the deactivated state.

This mode is compatible both with a use of the brake 5*a* as mechanical backup for a force feedback motor and to simulate a damping law.

This mode corresponds in particular to the case where all the other magnetic field sources located in the vicinity of the magnetizable element have a negligible magnetic field compared to the field produced by the magnetizable element 50*a* in the activated state.

One advantage of this embodiment is that the field produced by the magnetic transmitter does not interact with another permanent magnetic field. The total magnetic field at the magnetizable element can be known precisely.

Figure 4A:
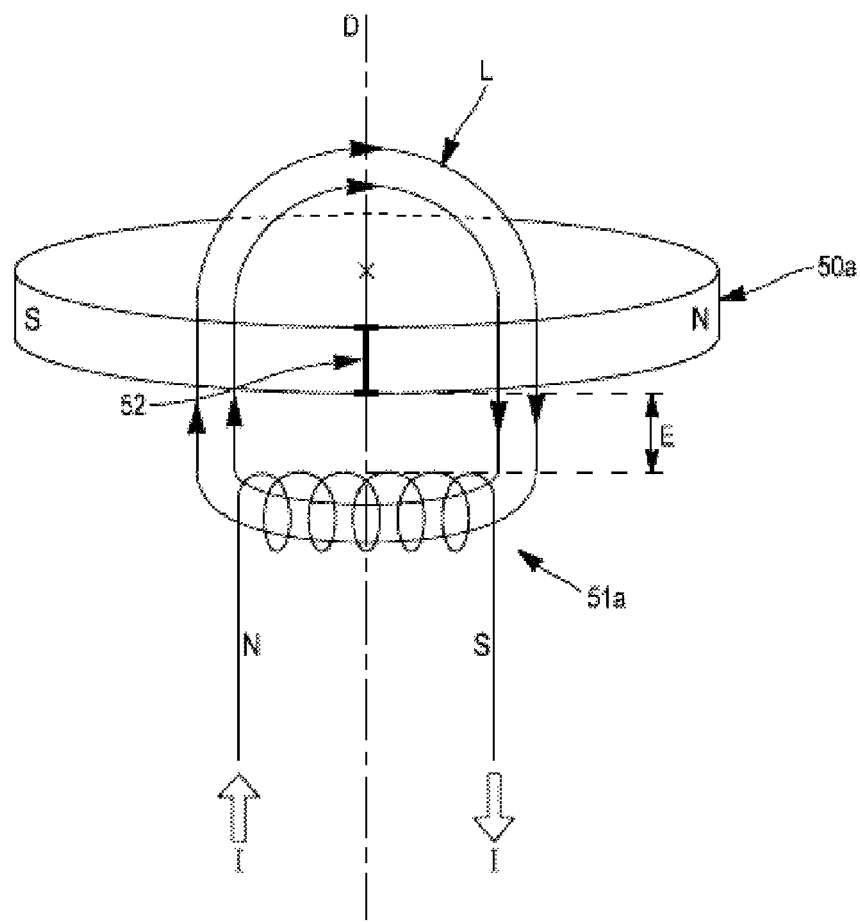
FIG. 4a schematically represents a magnetic brake of the force applying device of FIG. 3, in which the magnetic transmitter is in the activated state and the magnetizable element has a first position.
Figure 4B:
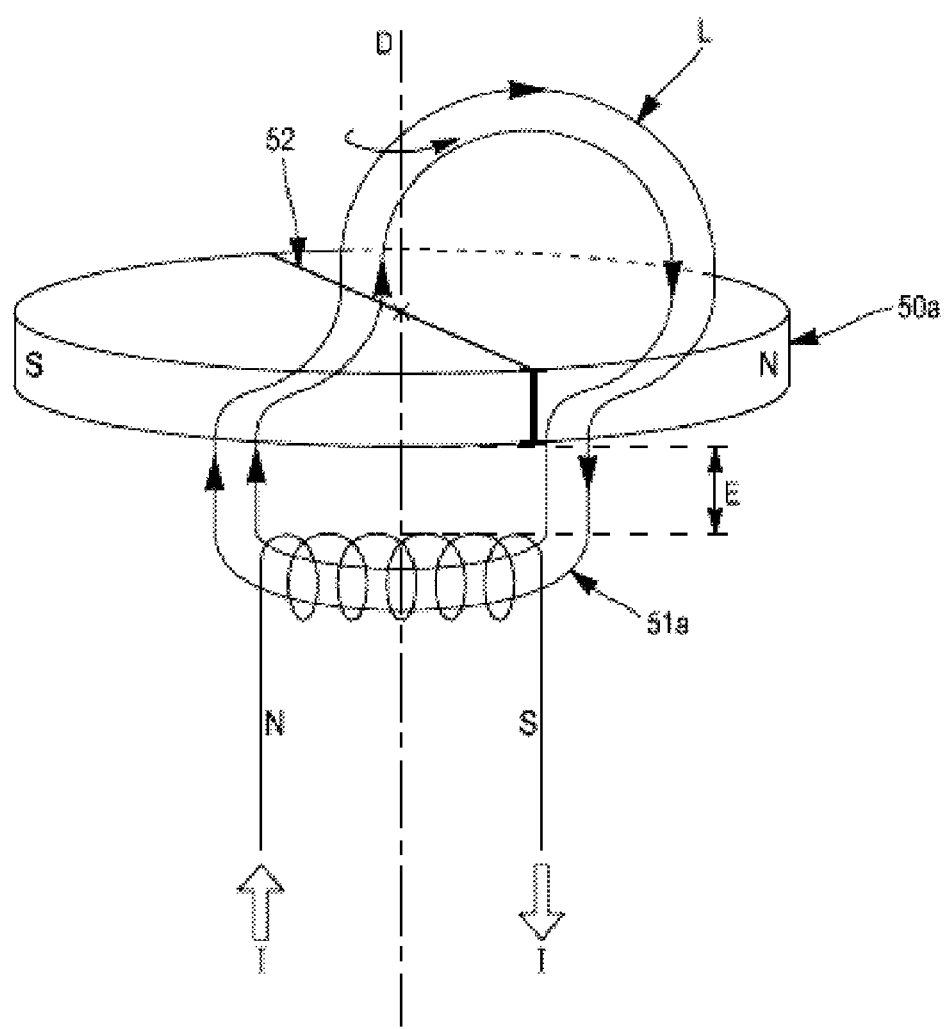
FIG. 4b schematically represents the same magnetic brake of the force application device of FIG. 3, in which the magnetic transmitter is in the activated state and the magnetizable element has a second position.

FIGS. 4*a* and 4*b* represent a magnetic brake 5*a* according to one example corresponding to this first embodiment.

In this example, the magnetic transmitter 51*a* is a solenoid fixed to the casing 9 (which is not represented) and which has an axis D as axis of symmetry. The axis D is preferably aligned with the axis A of the shaft A1 to which the magnetizable element 50*a* is fixed.

The magnetizable element is here a metal disk centered on the axis A of the shaft A1. The shaft A1 is an output shaft of the magnetic brake 5*a*. In the event that the magnetic brake is used as a complement or as a backup for a force motor, the shaft A1 is a drive shaft of the force motor (or is linked to said drive shaft). The disk is placed at the end of the shaft A1 and is located facing the solenoid 51*a*, at an air gap E distance from the solenoid 51*a*.

In the absence of electric current flowing at the terminals of the solenoid, the material of the metal disk 50*a* is not magnetized. The disk 50*a* and the shaft A1 are freely rotatable about the axis A relative to the solenoid.

In the activated state of the solenoid, an electric current flows at the terminals of the solenoid. This electric current is for example provided by a backup power supply unit 71*a*, on command of the control unit 8 of the aircraft.

One example of operation of the brake according to this example is described below.

If the magnetic brake is used as a mechanical backup for the roll motor 3*a*, the solenoid is preferably in the deactivated state in a nominal operation of the stick.

FIG. 4*a* illustrates a first position of the disk 50*a*, immediately after an activation time when the solenoid switches to the activated state. An electric current I flows at the terminals of the solenoid.

The solenoid in the activated state has a North magnetic pole to the left of the figure and a South magnetic pole to the right of the figure. The solenoid then produces a stable magnetic field. The magnetic field at the volume of the disk is represented by the field lines L in FIG. 4*a*.

The particles of the magnetizable element acquire residual magnetization. Due to this magnetization, the disk generates a magnetic field which interacts with the magnetic field of the solenoid. FIG. 4*a* represents an interface 52 between an area of South polarity and an area of North polarity of the disk after magnetization. The interface 52 is substantially perpendicular to the axis of the shaft.

The magnetization acquired by the disk after the activation time remains as long as the solenoid is in the activated state. Thus, during a pivoting motion of the disk 50*a* about the axis of the shaft, the interface 52 between the areas of North and South polarity also pivots following the motion of the disk.

The position of the disk 50*a* in FIG. 4*a*, immediately after the activation time, corresponds to a neutral point of the lever 1 in its motion about the roll axis X. The interaction between the magnetic field of the solenoid and the magnetic field of the magnetized disk tends to resist any motion away from the disk, and therefore from the lever, relative to this neutral point.

As such, FIG. 4*b* illustrates a second position of the disk 50*a*, offset from the neutral point. The disk 50*a* has reached this position by pivoting to the right about the axis of the shaft relative to the first position in FIG. 4*a*.

The interface 52 is thus offset so that its front portion is offset to the right in FIG. 4*b*. The South and North magnetic polarities of the disk 50*a* are angularly offset from the South and North magnetic poles of the solenoid 51*a*.

The interaction between the magnetic field generated by the solenoid 51*a* and the magnetization of the disk 50*a* opposes this offset in the polarities of the magnetized disk from the magnetic poles of the solenoid. A resistive torque is exerted at the disk, opposing the motion of the disk to the right.

The interaction between the magnetic field generated by the solenoid 51*a* and the magnetization of the disk 50*a* continues to oppose a distancing of the disk relative to the neutral point as long as the solenoid remains in the activated state.

If the electric current at the terminals of the solenoid is subsequently cut off, the magnetization of the particles of the disk 50*a* is preferably lost. The magnetization of the disk is thus preferably temporary. One advantage is that after deactivation of the solenoid 51*a*, for example by the backup power unit 71*a* if the roll motor 3*a* regains its functionality, the lever regains its standard operation without bias towards the neutral point. In the event of a new fault of the event roll motor, the disk 50*a* can again be magnetized by activation of the solenoid 51*a* with possibly a neutral point different from the neutral point represented in FIG. 4*a*.

In the example of FIG. 4*b*, the resistive torque exerted on the disk 50*a* is not sufficient to totally prevent the disk from pivoting relative to the solenoid. Thus, the disk is braked in its pivoting motion relative to the neutral point in FIG. 4*a* and is not blocked at the neutral point.

Alternatively, the solenoid 51*a* can be configured to completely block the disk 50*a* on the neutral point after magnetization of the disk. The latter case is advantageous for a force-piloting of the pilot stick, during which the lever 1 is blocked and the monitoring of the moving portions of the aircraft is made as a function of the torque exerted by the pilot on the lever pivotally along the axis X and along the axis Y.

In the present example, for an air gap distance E between 0.05 and 0.5 centimeters, for example one millimeter, between the disk and the solenoid, complete blocking of the disk on the neutral point can be obtained using a solenoid adapted to produce a magnetic field whose induction is higher than a threshold comprised between 0.1 and 10 Tesla, for example a threshold equal to 1 Tesla, on the disk at the neutral point.

It will be noted that in a known manner, the induction of the magnetic field generated by a solenoid increases with the intensity of the electric current which passes through the solenoid. Thus, it is possible to control the solenoid so as to obtain a variable magnetic field as a function of a magnetic field setpoint. The solenoid can for example be used to generate a resistive force calculated according to a damping law.

The solenoid therefore also constitutes a satisfactory solution for exerting a monitored resistant force on the lever via the shaft.

In a second embodiment of the magnetic brake, the magnetizable element 50*a* is magnetized in the deactivated state of the magnetic transmitter 51*a*, that is to say, in the absence of a magnetic field emitted by the magnetic transmitter. For example, another source of magnetic field, adding to the magnetic transmitter, is present in the vicinity of the magnetizable element 50a.

A permanent magnet, configured to produce a permanent magnetic field at the volume occupied by the magnetizable element which compensates for the magnetic field of the magnetic transmitter when the magnetic transmitter is in the activated state, is advantageously used as an additional magnetic field source.

The permanent magnet, made of ferromagnetic material, emits a permanent magnetic field even in the absence of any electric current. Preferably, the geometry of the permanent magnet is chosen so that the magnetic field it generates is in the same direction as the field generated by the solenoid in the activated state at the axis D.

This second embodiment, which is not represented in the appended drawings, is in particular advantageous in the event where the magnetic brake 5a is used as a magnetic backup for the roll motor 3a. Indeed, if the magnetic transmitter 51a (for example a solenoid similar to the one described above in relation to FIGS. 4a and 4b) is configured to receive a common power supply with a power supply of the computer 70, and/or common with a power supply of the roll motor 3a, then the magnetic transmitter 51a is automatically and instantly deactivated in the event of interruption of a power supply causing a fault in the roll motor.

Preferably, the piloting system according to this second embodiment therefore does not comprise a backup power supply unit. The magnetic transmitter is thus affected by a power supply interruption on the processing chain of the roll motor.

The operation of a magnetic brake according to this second embodiment can take place as follows, in the event where the magnetic transmitter is a solenoid and the magnetizable element is a disk.

During the nominal operation of the pilot stick, the solenoid is in the activated state. The magnetic field produced by the solenoid compensates for the field of the permanent magnet. The disk is not magnetized or very little magnetized.

In the event of interruption of power supply affecting the processing chain of the roll motor, the current at the terminals of the solenoid is cut off. The total magnetic field at the volume occupied by the disk thus becomes substantially equal to the magnetic field produced by the permanent magnet. The disk is therefore magnetized immediately after a time of deactivation of the solenoid.

A neutral point is thus created, corresponding to the position of the disk at the deactivation time. The interaction between the magnetic field generated by the permanent magnet and the magnetization of the disk creates, at the disk, a resistive torque opposing a distancing of the disk from the neutral point, in a manner similar to the operation described in relation to FIGS. 4a and 4b.

This resistive torque generated by the magnetic brake is reflected on the drive shaft of the roll motor, so as to brake, or even block, the motion of the pilot stick imposed by the pilot about the roll axis.

Method for Monitoring the Mechanical Backup Force Application Device

According to one possible operating mode, a force application device associated with a pilot stick is used to take over from a force feedback motor, preferably an electric motor, in the event of a fault affecting the operation of said motor. The force application device comprises one or several magnetic brake(s), preferably a brake associated with the roll axis of the lever and a brake associated with the pitch axis of the lever.

Figure 5:
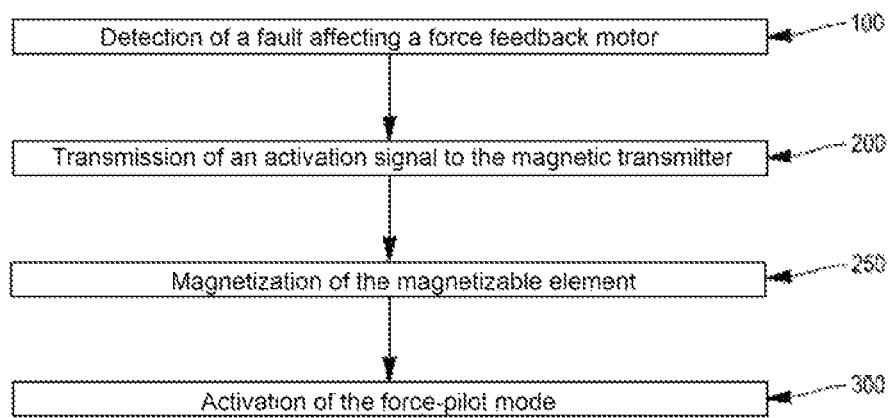
FIG. 5 is a flowchart of the steps of a method for monitoring a force application device of the invention, in mechanical backup.

FIG. 5 represents the steps of a method for monitoring a force application device as mechanical backup for a force feedback motor.

This method is for example implemented by a pilot stick in accordance with the description above in relation to FIG. 3.

In a step 100, a fault on a processing chain of the force feedback motor is detected. The fault is for example a mechanical failure or a loss of power supply of the motor which is no longer able to provide sufficient force feedback on the pivot axis of the lever associated thereto, or a fault in the processing or communication of the control signals including the force setpoint, or a loss of power of the computer 70.

In a step 200, an activation or deactivation signal for the magnetic transmitter of the brake is transmitted to the magnetic transmitter. The magnetic transmitter is monitored so that the magnetizable element of the brake is magnetized.

In particular, if the magnetic brake conforms to the embodiment illustrated in FIGS. 4a and 4b, the signal transmitted in step 200 following the detection of a fault is an activation signal for the solenoid acting as a magnetic transmitter. An electric current of non-zero intensity then flows at the terminals of the solenoid.

In response to the signal transmitted in step 200, the magnetizable element of the magnetic brake is magnetized in step 250. Preferably, the lever and the brake are dimensioned so that in step 250, the lever is blocked pivotally along the axis associated with the force feedback motor for which the fault has been detected (for example, the roll or pitch axis), under the effect of the interaction between the magnetic field of the magnetized disk with the magnetic field of the magnetic transmitter, or with the field of a permanent magnet.

Preferably, the piloting system enters in a step 300 a force-pilot mode of the stick. The resistive force exerted on the shaft of the magnetic brake by magnetostatic interaction, after the occurrence of the fault event, is then large enough to block the shaft in rotation.

In the force-pilot mode, the roll force sensor 6a and the pitch force sensor 6b take over from the position and/or speed sensors 4a and 4b on the roll and pitch axes of the lever, for the piloting of the moving portions of the aircraft. The piloting control signals generated by the control unit 8 (the FCU) are a function of the forces detected on the lever. The lever remains blocked for the duration of the force-pilot mode.

The force-pilot mode can then be deactivated as soon as the fault on the processing chain of the motor associated with the brake is resolved. The magnetizable element of the magnetic brake is preferably demagnetized.

It will be noted that the transmission of an activation or deactivation command to the magnetic transmitter is not necessary in some cases, in particular if the magnetic transmitter is directly connected to the power supply of the force feedback motor, in the embodiment where the power supply interruption of the magnetic transmitter causes the magnetization of the magnetizable element.

One advantage of the mechanical backup monitoring described above is that the side-stick cannot switch into a mode where the pilot can freely pivot the lever.

Method for Monitoring the Force Application Device in Damping Law

Figure 6:
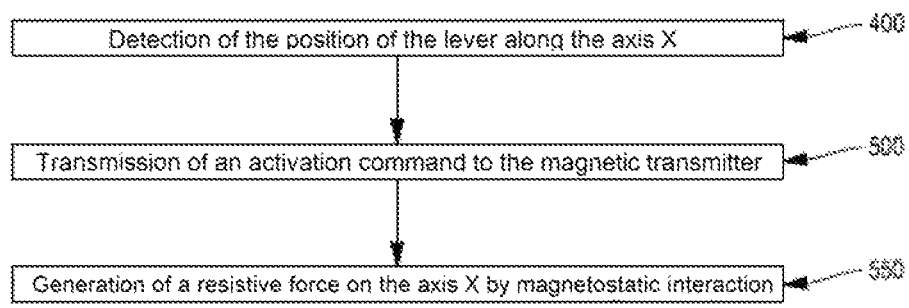
FIG. 6 is a flowchart of the steps of a method for monitoring a force application device of the invention, in damping law.

FIG. 6 represents the steps of a method for monitoring a force application device to simulate a damping law.

This method is for example implemented by a pilot stick in accordance with the description above in relation to FIG. 3. The magnetic transmitter of the magnetic brake of the force application device is here capable of emitting a variable magnetic field as a function of a magnetic field setpoint.

In this case, the magnetic brake is not necessarily associated with a force feedback motor whose fault is desired to be eliminated, to ensure the haptic feedback at the lever. The magnetic brake participates, during the nominal operation of the pilot stick, in the force feedback on the lever.

The example below concerns the motions of the lever along the roll axis X. It will be understood that the method can be implemented to damp the motions of the lever along the pitch axis or along any other axis of rotation.

In a step 400, a position and/or speed of the lever about the axis X is detected, for example via the position and/or speed sensor 4a.

In a step 500, an activation signal for the magnetic transmitter of the magnetic brake associated with the axis X is generated by the computer 70. The activation signal corresponds to a magnetic field setpoint determined based on the position and/or speed of the lever according to a predetermined law.

For example, if the magnetic transmitter is a solenoid, the activation signal can correspond to an electric current transmitted by the computer 70 at the terminals of the solenoid whose electric intensity depends on the desired induction of the magnetic field generated by the solenoid.

The activation signal is transmitted to the magnetic transmitter. The interaction between the magnetic field of the magnetic transmitter and the field of the magnetizable element has the effect of producing, at a step 550, a resistive force which opposes rotational motions of the shaft of the magnetic brake about its axis.

One advantage of the monitoring in damping law described above is that the magnetic brake participates in the force feedback, as a complement to or as a replacement for possible force feedback (in particular electric) motors. It is possible to reduce the dimensions of the force motors and the space requirement and the total mass of the pilot stick.

The invention claimed is:

1. A force application device for a pilot stick of an aircraft, wherein the pilot stick comprises a control lever driving a shaft in rotation about a first axis, the shaft extending along the first axis, wherein the device comprises a magnetic brake comprising:
   a magnetizable element mounted on the shaft, and
   a magnetic transmitter opposite to the magnetizable element while being freely rotatable about the first axis relative to the magnetizable element, said magnetic transmitter having an activated state, in which the magnetic transmitter is supplied with current and generates a magnetic field at a volume occupied by the magnetizable element, and a deactivated state in which the magnetic transmitter is not supplied with current and does not generate a magnetic field, so as to prevent rotation of the magnetizable element relative to the magnetic transmitter about the shaft.

2. The force application device according to claim 1, wherein the magnetizable element comprises at least one of the following materials: iron, cobalt, stainless steel, silicon, boron.

3. The force application device according to claim 1, wherein the magnetic transmitter is a solenoid.

4. The force application device according to claim 1, wherein the magnetic transmitter is able to produce, at the volume occupied by the magnetizable element, a magnetic field of induction higher than a threshold comprised between 0.1 Tesla and 10 Tesla, the threshold being preferably greater than 1 Tesla.

5. The force application device according to claim 1, wherein the magnetizable element is configured to be magnetized when the magnetic transmitter is in the activated state and to be demagnetized when the magnetic transmitter is in the deactivated state.

6. The force application device according to claim 1, further comprising a permanent magnetic device, configured to produce a permanent magnetic field at the volume occupied by the magnetizable element which compensates for the magnetic field of the magnetic transmitter when the magnetic transmitter is in the activated state.

7. The force application device according to claim 1, further comprising a mechanical joint secured in rotation to the lever about a second axis, and a force sensor configured to measure a torque exerted on the lever which causes a rotation of the mechanical joint about the second axis.

8. The force application device according to claim 1, further comprising a mechanical joint secured in rotation to the lever about a roll axis and about a pitch axis, the pilot stick comprising:
   the shaft, connected to the mechanical joint and whose rotation about the first axis is linked to the rotation of the mechanical joint about the roll axis, and
   an additional shaft, connected to the mechanical joint and whose rotation about an additional axis is linked to the rotation of the mechanical joint about the pitch axis,
   wherein the force application device further comprises an additional magnetic brake comprising:
   an additional magnetizable element mounted on the additional shaft, and
   an additional magnetic transmitter opposite to the additional magnetizable element while being freely rotatable about the additional axis relative to the additional magnetizable element, said additional magnetic transmitter having an activated state, in which the additional magnetic transmitter is supplied with current and generates a magnetic field at the volume occupied by the additional magnetizable element, and a deactivated state in which the additional magnetic transmitter is not supplied with current and does not generate a magnetic field, so as to prevent a rotation of the additional magnetizable element relative to the additional magnetic transmitter about the additional shaft.

9. An active pilot stick for an aircraft comprising:
   a force application device according to claim 1, and
   a lever movable in rotation about a second axis, the rotation of the shaft of the force application device about the first axis being linked to the rotation of the lever about the second axis.

10. The stick according to claim 9 further comprising:
    a force feedback computer, and
    a force feedback motor, the shaft corresponding to a drive shaft of said motor, said motor being configured to exert a force feedback on the second axis, a torque exerted during operation of the stick by the force feedback motor being a function of a control signal transmitted by the computer.

11. The stick according to claim 10, further comprising an angular position sensor, the control signal being calculated based on an angular position of the shaft about the first axis measured by said sensor.

12. The stick according to claim 10, wherein the force application device further comprises a backup power supply unit configured to provide power supply to the magnetic transmitter when the magnetic transmitter is in the activated state, said power supply being distinct from a power supply of the computer.

13. The stick according to claim 10, wherein the magnetic transmitter of the force application device is configured to receive a power supply common with a power supply of the computer when the magnetic transmitter is in the activated state.

14. The stick according to claim 13, wherein the force application device further comprises a permanent magnetic device, configured to produce a permanent magnetic field at the volume occupied by the magnetizable element of the force application device which compensates for the magnetic field of the magnetic transmitter when the magnetic transmitter is in the activated state.

15. A method for mechanical backup monitoring of a force application device for an aircraft pilot stick, the method being implemented using the pilot stick according to claim 9, the stick comprising a force feedback motor, the method comprising:

detecting a fault on a processing chain of the force feedback motor, transmitting to the magnetic transmitter of the force application device an activation or deactivation signal for the magnetic transmitter, and optionally, activating a force-pilot mode of the stick.

16. A method for monitoring in damping law a force application device for an aircraft pilot stick, the method being implemented using the pilot stick according to claim 9 and comprising:

detecting a position and/or speed of the lever, and generating an activation signal for the magnetic transmitter of the force application device comprising a magnetic field setpoint determined based on the position and/or speed of the lever according to a predetermined law, the activation signal being transmitted to the magnetic transmitter.

* * * * *